June 30, 1953  W. C. HEATH  2,643,725
ELECTRICALLY WELDED HOLLOW STEEL PROPELLER
BLADE AND METHOD OF MAKING SAME
Original Filed March 26, 1943  3 Sheets-Sheet 1
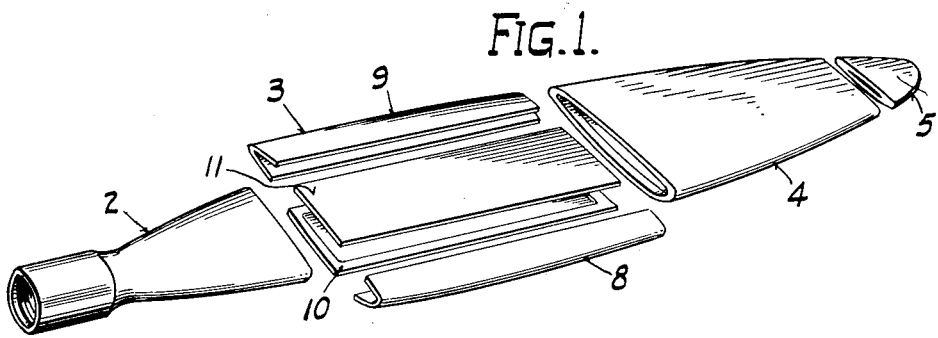
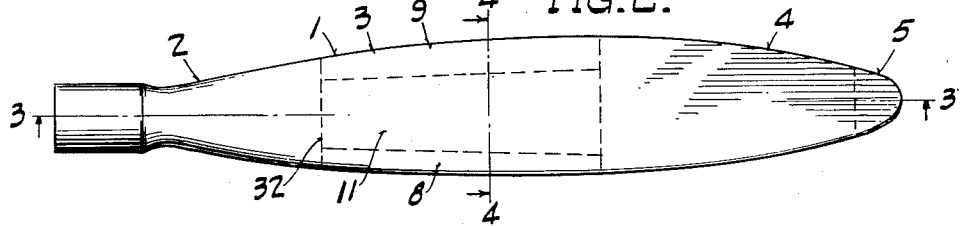
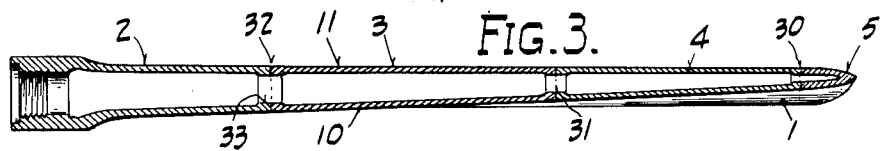
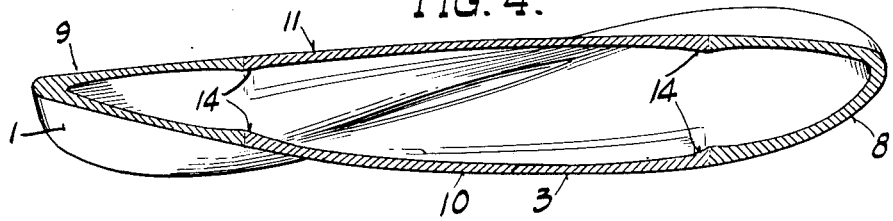
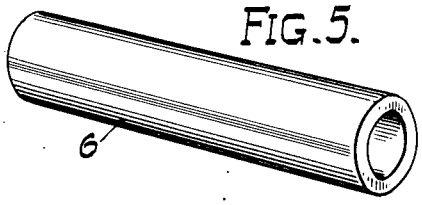
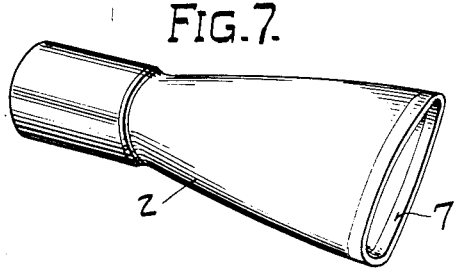
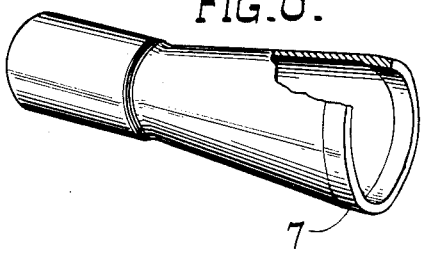
INVENTOR.
William C. Heath
BY
ATTORNEYS.

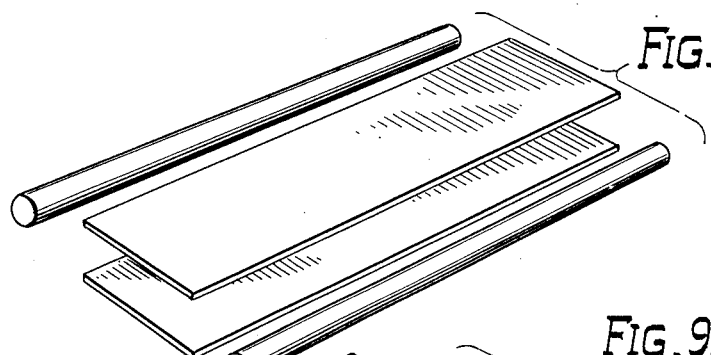
FIG. 8.
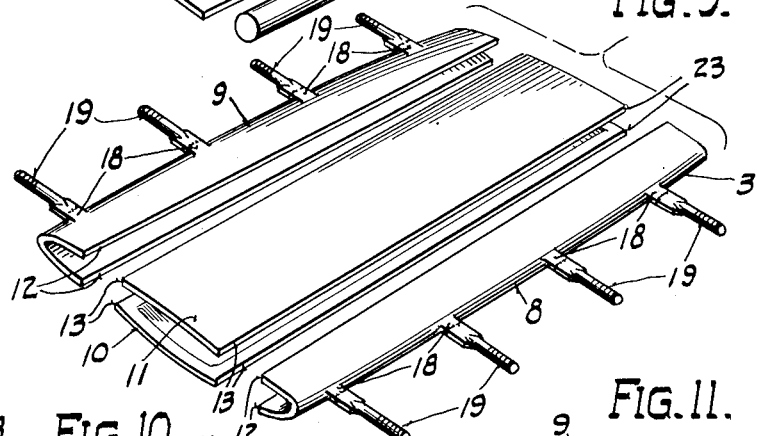
FIG. 9.
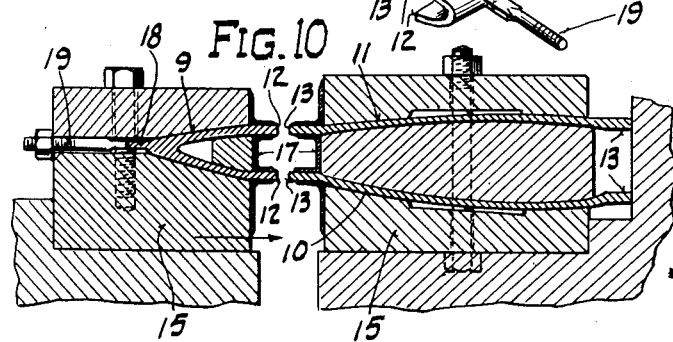
FIG. 10
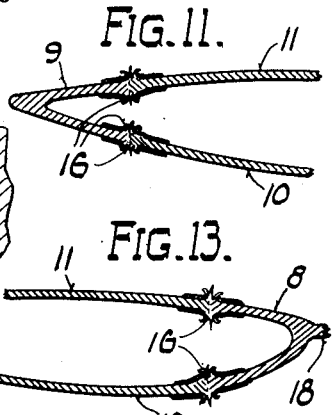
FIG. 11.
FIG. 13.
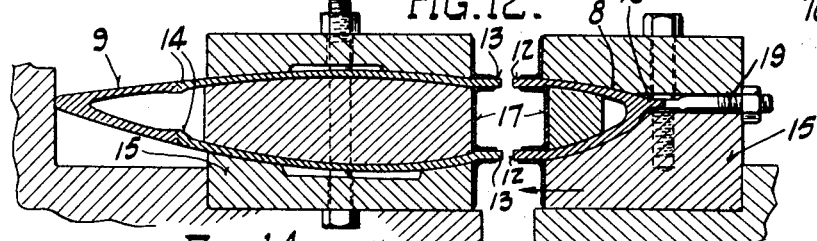
FIG. 12.
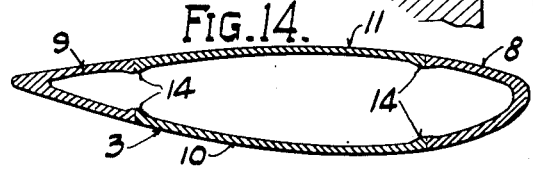
FIG. 14.
INVENTOR.
William C. Heath
BY
ATTORNEYS.

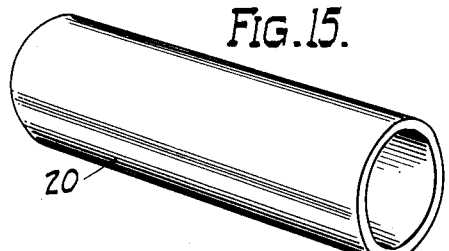
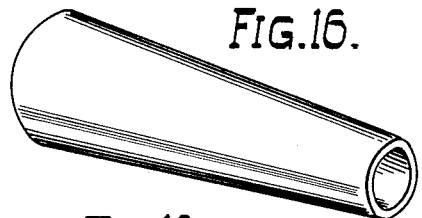
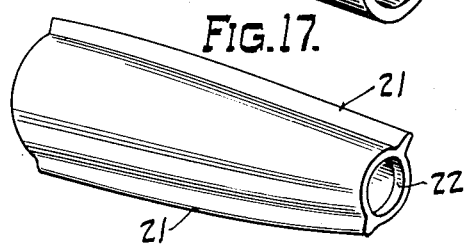
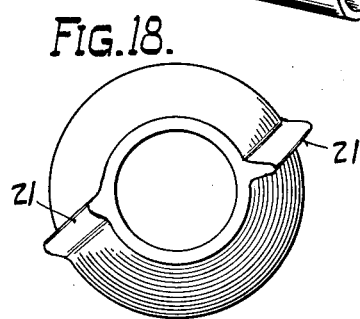
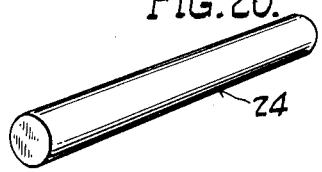
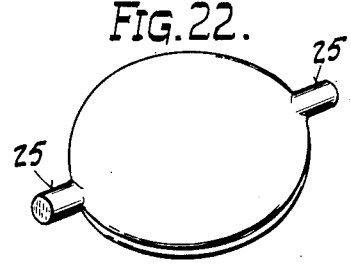
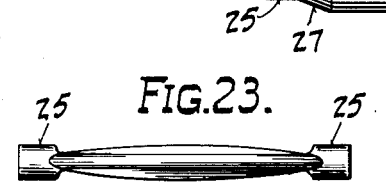
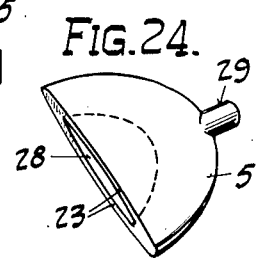
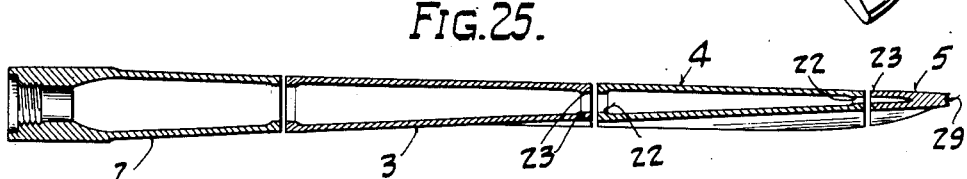
*INVENTOR.*
William C. Heath Patented June 30, 1953

2,643,725

UNITED STATES PATENT OFFICE 2,643,725

ELECTRICALLY WELDED HOLLOW STEEL PROPELLER BLADE AND METHOD OF MAKING SAME

William C. Heath, Milwaukee, Wis., assignor to A. O. Smith Corporation, Milwaukee, Wis., a corporation of New York Original application March 26, 1943, Serial No. 480,682. Divided and this application January 12, 1950, Serial No. 138,142

26 Claims. (Cl. 170—159)

This invention relates to electrically welded hollow steel propeller blades and to methods of making the same. This application constitutes a division of application Serial No. 480,682, filed March 26, 1943, and now abandoned.

The invention is particularly suitable for the construction of large blades for use on bombers and transport planes and for stratosphere flying. It not only provides the only satisfactory method and construction for large propellers, but by reason of its reduction in waste of material and simplification of steps of manufacture, it greatly reduces the cost of blades as compared to other types of blades.

The best commercial attempt at making hollow steel propeller blades heretofore involved the starting with a blank weighing a total in excess of 250 pounds and ending with a propeller blade weighing about 60 pounds. In comparison with this, the present invention in its crude state has already successfully demonstrated that a propeller blade of similar size and weight and greater strength can be constructed from blanks weighing a total of less than 200 pounds. This phenomenal saving, in excess of about 20%, in expensive alloy steel, and the production of a strong propeller blade is the outstanding contribution of the present invention. Upon further commercial use and refinement of the invention, it is expected that additional savings in material and cost will be obtained.

The principal object of the invention is to greatly reduce the cost of blades of this type by saving in material waste and by simplification of manufacturing steps.

Other more specific objects are to provide a construction and method of making the same that will be applicable to any design of blade desired for any type of airplane, with a minimum of tool changes and costs and with low cost mass production operations.

Another specific object is to provide a hollow steel propeller blade that is lighter for its strength and capacity.

Another object is to provide a method of making a hollow steel propeller blade by electric flash welding in which the welds are composed solely of the parent metal of the stock.

Another object is to provide a method of making a blade in which several longitudinal sections are first produced and then butt-welded end to end.

Another object is to provide a method in which several parts are formed separately with the desired shape and twist of the respective parts in the finished blade and then electrically welded together.

Another object is to provide a method as above referred to in which each longitudinal section of the blade is fabricated separately with the central blade section being made up of longitudinal leading and trailing edge sections and camber and thrust plate sections welded together along longitudinal lines remote from the regions of greatest stress.

Another object is to provide for the more ready removal of flash from the welds in an electrically flash welded blade.

Another object is to provide a sequence of manufacturing operations and of testing and balancing of the parts during fabrication that will greatly reduce the waste from rejects and simplify repair and correctional operations.

Another object is to provide a blade made under mass production manufacturing operations and that will be true in dimensions and balance within a closer range of tolerances than heretofore.

Another object of the invention is to provide a method whereby the individual sections of the blade are balanced separately and then the complete blade is balanced after fabrication.

Another object is to provide a more perfectly shaped and balanced propeller blade of the hollow steel type.

Other objects and advantages will be set forth in the accompanying description of the preferred embodiment of the invention and of the practice thereunder illustrated in the drawings.

The views of the drawings are as follows:

Figure 1 is an isometric view of the parts prior to assembly by welding;

Fig. 2 is a plan view of the finished welded blade after machining and balancing;

Fig. 3 is a central longitudinal section taken on line 3—3 of Fig. 2;

Fig. 4 is a central transverse section taken on line 4—4 of Fig. 2;

Fig. 5 is a perspective view of the blank from which the shank is made;

Fig. 6 is a similar view of the shank after it has been expanded conically and showing a part at the blade end broken away and sectioned;

Fig. 7 is a similar view of the shank after the blade end has been flattened and machined to correspond in cross section and shape to the body of the blade;

Fig. 8 is a perspective isometric view of the several stock pieces from which the central body section of the blade is made;

Fig. 9 is a view similar to Fig. 8 showing the related parts after forging and machining and prior to welding;

Fig. 10 is an enlarged central transverse section showing a trailing edge and the foils clamped in position for welding;

Fig. 11 is an enlarged transverse section of the welds between the trailing edge and the two foils immediately after welding and prior to removal of the flash;

Fig. 12 is similar to Fig. 10 and shows the welding of the leading edge to the foils;

Fig. 13 is similar to Fig. 11 showing the welds between the leading edge and the two foils;

Fig. 14 is a transverse section of the completed central body section after welding and flash removal;

Fig. 15 is a perspective view of the tubular blank from which the tip section of the body of the blade is made;

Fig. 16 is a view similar to Fig. 15 showing the blank after it has been formed to conical shape;

Fig. 17 is a similar view of the conical blank with side ribs corresponding to the leading and trailing edges and machined and coined preparatory to flattening;

Fig. 18 is an end view of the blank of Fig. 17;

Fig. 19 is a perspective view showing the blank flattened to the shape of the blade and machined for welding;

Fig. 20 is a perspective view of the blank from which the two tips are made;

Fig. 21 is a side elevation of the blank of Fig. 20 after machining preparatory to forging;

Fig. 22 is a view similar to Fig. 20 after the blank has been forged;

Fig. 23 is an edge view of the blank of Fig. 22;

Fig. 24 is a perspective view of a single tip blank after final forming and machining; and Fig. 25 is a longitudinal central section of the several blade sections before welding of the transverse seams.

In carrying out the invention, the blade is made in a plurality of sections welded together end to end. The number of sections will depend upon the size and length of the blade and the capacity of the machines employed in the manufacture of the sections. The blade 1 illustrated, being in excess of about six feet in length, is constructed of a shank section 2, a body section 3, a tip section 4 and an end tip 5, all of the sections being electrically flash welded together along transverse lines to complete the blade.

The shank 2 is formed from a seamless tubular blank 6 of thick wall, by first machining the same both inside and out to provide a tapered thickness for the blank, then heating to a suitable forging temperature and expanding the blade end thereof conically, as illustrated in Fig. 6, and then flattening the conical end as shown in Fig. 7. Preferably during forming and prior to flattening, the end edge of the blank is contoured as by machining to provide a thickened and axially straight end edge portion 7 for the blank. After flattening of the larger end of the blank to the contour and pitch twist of the blade and sizing it, the end edge is machined preparatory to flash welding to the body section 3.

The body section 3 is constructed of four parts, as illustrated in Figs. 8 to 14, inclusive, the leading edge forging 8, trailing edge forging 9, camber face 10 and thrust face 11. The leading and trailing edge forgings 8 and 9 are forged from round bar stock while the foils 10 and 11 are forged from flat plate stock. In the forging operations the longitudinal edges and the transverse edges of the several parts are formed thicker than the adjacent body portion of the parts with the thickening extending to the inside of the blade.

In forming the leading and trailing edge forgings 8 and 9, the hot blank is first flattened and then curved edgewise to conform to the curvature of the respective edge in the finished blade, after which the blank is split along one edge by suitable dies and successive forging operations to form the V-shape required for the forging with the final blade angle and pitch twist. The projecting welding edge portions 12 are formed with straight parallel elements to present a straight line approach for the edges during welding as successive edge portions are flashed away.

In forming the foils 10 and 11, the plates are heated and preferably roll-forged in different directions to provide foils with the desired thickness tapering from the thicker hub end to the thinner tip end and coined to the required blade angle and pitch twist, with thicker edge portions 13 for welding. The welding edge portions 13 are constructed complementary to welding edge portions 12 of the leading and trailing edge forgings to insure that the opposing edge portions of the respective pieces are maintained in abutting alignment throughout the subsequent heating and welding operations. The additional thickness of welding edge portions 12 and 13 is on the inside so that upon completion of the welds the strengthening beads 14 appear along the welds on the inside of the section. The same is true as to all other welds in the blade including the transverse welds joining the sections end to end.

In the flash welding operation the parts are clamped in welding electrodes 15 as shown in Figs. 10 and 12 with their respective complementary edge portions 12 and 13 projecting toward one another and aligned for welding. The welding potential is applied and the respective opposing edges moved toward each other until a flashing arc is set up by the current passing from edge to edge. The feeding of the parts is governed in accordance with the flashing off of the metal at the edges and when a sufficient heating of the metal immediately adjacent the edge faces is attained, the remaining edges are abutted under pressure and the welding current discontinued. Generally, from one-eighth to one-quarter of an inch of metal is consumed by the flashing off of metal from each edge, and the parts constructed with sufficient additional metal at the edges to compensate for this and for the extrusion of metal at the joint in the final bump.

In flash welding a much higher temperature of the metal on the opposed edge surfaces is reached than in ordinary electric resistance welding. This is true because flash welding employs a heating of the edges without pressure contact therebetween and involves the melting and subsequent expulsion of preliminary contacting edge portions by the sudden super-heating and gasification of the contacting metal. The above described expulsion occurs in rapid successive explosions of the highly heated metal particles all along the edges as soon as the flashing process has been established throughout the edges. At the time of the final bumping of the edges together under pressure the fluid metal layer at the faces of the meeting edges is extruded under pressure laterally from the joint carrying with it most of the oxides that may be present.

Upon completion of the longitudinal flash welding operations between the trailing edge forging 9 and the foils 10 and 11 the flash 16 is removed from both the inside and outside, preferably by a chisel or other suitable tool, and then the seam is dressed as by a belt sander or other device to smooth the same in line with the contour of the parts. Following this operation, the leading edge forging 8 is flash welded to the remaining longitudinal edges of the foils 10 and 11 and the welds cleaned in the manner above described. Where the material of the blade has a tendency to harden at the line of weld it is advisable to remove such hardness by annealing before removal of the flash.

The blade is made of a high strength low alloy steel of the kind described and claimed in applicant's divisional application Serial No. 134,-745, filed December 23, 1949, now U. S. Patent 2,617,004 of November 4, 1952, and which has a greater strength in the plastic temperature range than ordinary steels.

A coating 17 is employed on the parts to prevent sticking of sputter during welding. This is particularly important in the making of propellers since sputter, when welded to the inside surface of the blade, is extremely difficult to remove, and if not removed it may seriously hamper the balancing of the blade. A suitable composition for preventing the welding of sputter to the surface of the parts contains a large amount of magnesium and calcium silicates with calcium oxide and a small amount of graphite. Various compositions may be employed within the scope of the invention, the essence lying in providing a material with refractory ingredients which prevent sticking of the sputter to the parts.

In order to facilitate the flash welding operation and to secure the forgings 8 and 9 in their respective welding clamps during welding, the parts are forged with integral projections 18 spaced along the back side and to which lugs 19 are temporarily welded for holding purposes as set forth in U. S. Patent No. 2,403,076. After welding, the lugs 19 and projections 18 are removed. The welding is carried out preferably in the manner described in U. S. Patent No. 2,-401,243.

After the longitudinal seams of the center section 3 are welded and cleaned, the end edges are machined parallel and the section sized in suitable dies to accurate shape, blade angle, pitch twist and dimensions.

The tip section 4 may be constructed in a manner similar to center section 3, but in the blades which have been constructed the section 4 was formed from seamless tubing. In this construction the cylindrical blank 20 is electroformed by the Westin process to a substantially conical shape, as illustrated in Fig. 16. The process is described in United States Letters Patent No. 2,309,561. The blank is of a predetermined excess thickness and the outside of the conically shaped blank is cam turned to provide ribs 21 properly located and with the desired twist for the leading and trailing edges and to provide the desired varying wall thickness of the foil portions intermediate the ribs. The ribs are then enlarged by extruding material outwardly as by a forging operation between properly contoured dies and at required forging temperature to provide fins of the proper dimension for the leading and trailing edges. The blank is contour-machined inside to provide varying wall thickness longitudinally corresponding to that desired in the finished tip section. The machining operation also provides for thicker straight end edges 22 for welding to corresponding edges 23 of sections 3 and 5.

The blank is then spread by a suitable expander in the twisted plane of the ribs 21 and then flattened by successive forming operations on a mandrel to simulate the final blade shape of tip section 4 with the blade angle and pitch twist required.

The tip 5 is formed in pairs from a round bar 24 which is first either machined or forged at the ends to provide relatively small diameter end sections 25 separated from the central body 26 of the blank by conical sections 27. The blank is then heated to a forging temperature and flattened throughout the central portion as illustrated in Figs. 22 and 23. It is then severed transversely into two like tips and a cavity 28 forged in the end face of each tip as illustrated in Fig. 24. The tips have the relatively cylindrical ends of the blank forming a central nipple 29 in the end edge of each tip.

In the manufacture of small propellers it is possible to form only a single body section in place of sections 3 and 4. Larger propellers, however, require two or more sections in the body due to the difficulty of suitably designing the parts for satisfactory flash welding. The flash welding operations are greatly simplified where the length of the longitudinal seams being welded does not exceed two or three feet. The desirable length of section to be employed will depend somewhat upon the shape and curvature of the blade and the available welding apparatus. Another advantage of employing a plurality of reasonably short sections lies in the ease of handling and the prebalancing of each section to obtain a more accurate balance of the finished blade.

In the manufacture of the sections 2, 3, 4 and 5 of the blade, the parts are thoroughly inspected between the several machining, forging and forming operations to cull out any rejects before the welding operations so as to save in the cost of manufacture. This inspection includes repeated magnaflux tests for surface and subsurface defects. The fact that the propeller is made up of relatively small parts greatly facilitates this type of inspection.

In addition to this, the blanks are suitably normalized from time to time to prevent injury due to possible building up of cold working stress therein. Prior to machining operations, the blanks are annealed to soften the metal and facilitate machining.

The several sections 2, 3, 4 and 5 are then weighed and tested for balance in both vertical and horizontal directions, and any lack of balance is corrected by sanding off the surface in the required location until each section is separately in balance. Any overweight is likewise removed. The end edges 22 and 23 of the sections are machined in planes normal to the longitudinal axis of the blade preparatory to welding.

The sections are coated inside and out, adjacent the transverse edges, with the material previously referred to for preventing sticking of sputter, and then the tip 5 is flash welded to the smaller end of the tip section 4. In this flash welding operation, the straight edge portions flash away and the weld results at the center of the thicker edge portions, leaving a transverse bead 30 on the inside of the blade. The flash is then removed and the seam polished on the outside. Usually the thickness of the blade at the location of this transverse weld is so small that it is impractical to remove all the inside flash, although any loose sputter should be removed.

The next transverse seam welded is that between the larger end of the tip section 4 and the adjacent end of the body or blade section 3. After this seam is flash welded, the flash is removed from both the inside and outside and the seam buffed or polished to the contour of the adjacent surfaces. A rib 31 is produced on the inside of the seam and joins with the longitudinal strengthening beads 14 of the body section to add rigidity to the blade and tend to prevent blade vibration in service.

The final transverse weld 32 is made in a manner similar to the previous welds and has a rib 33 on the inside which joins with the inner ends of beads 14 and adds rigidity to the blade. The weld 32 is cleaned in the same manner as the other transverse welds previously described.

The blade is then weighed and checked for contour, including twist. If inaccurate relative to rough tolerances it is buffed to within the tolerance. Then the blade is heated to 1700° F. and die-quenched, i. e., placed in a die or mold which is cooled as by water flowing through passages in the die, and the blade is filled with nitrogen under a pressure of 300 lbs. per sq. in. to press all parts of the blade outwardly into contact with the die. After quenching, the blade is drawn by heating to approximately 1225° F. and slowly cooled. Different temperatures and practices may be employed for different alloys.

The blade is then shot-blasted inside and outside to remove scale, and rough draw polished outside. The end 29 of the tip is then centerpunched in line with the longitudinal center line of the blade and the shank is rough-machined and ground to final dimensions and tapped, the tip end 29 removed and the blade finally balanced.

The invention obtains a very great saving in material as compared with prior commercial hollow steel propeller blade manufacture. In addition, it provides a mass production manufacture in which the several sections can be fabricated in separate departments and then passed to a final assembling department, each with the requisite machines, furnaces and conveyors for handling the parts. By making the blade of sections of comparatively light-weight the several manufacturing operations are greatly facilitated.

The longitudinal welds are well removed from the leading and trailing edges of the blades where the maximum stress is believed to occur in service. The reinforcing of the welds by thickening toward the inside results in a structure of added rigidity and less tendency to destructive vibrations.

By employing flash welding, the present invention provides a rapid mass production assembly and at the same time produces joints of the full strength of the stock, avoiding the addition of weld metal from external sources which has been necessary heretofore and which constitutes a source of possible weakness in the blade. The combining of flash welding with the location of the seams and the added thickness of metal at the seams assures the production of blades of adequate strength for all types of service. It also makes possible the production of blades of various shapes in a single plant and with only a minor cost of tool change.

The combining of the flash welding with relatively high strength low alloy steel stock enables the manufacture of blades and the removal of flash from the narrow inside of the blades. The employment of the protective coating during the flash welding to prevent sticking of flash and sputter on the inside facilitates the removal of flash from the inside of the blade and the final balancing of the blade.

The employment of longitudinal butt welds in the foil sections and of transverse butt welds in the blade provides an integral structure of continuous contour and strength. The longitudinal welds need only withstand the stresses in the foils as distinguished from the complicated stresses present at the leading and trailing edges. The transverse welds are in both tension and shear and can readily withstand the stresses the same as the stock can.

The forging of the several parts to substantially final accurate shape is an important feature. It greatly facilitates the providing of accurate varying thicknesses for the several sections of the blade so that each section can be designed to its own requirements and no extra unnecessary weight of metal employed. The forging of the leading and trailing edge members from bar stock enables the control of thicknesses in the edges in a manner not possible in the earlier suggestions of forming blades from sheet metal, nor in the earlier practice of forming blades from cylindrical blanks. The actual edge portions of the leading and trailing edge forgings are left solid for a substantial distance from the edge to strengthen the same. This avoids the necessity of adding fillets.

The invention enables each part and section of the blade to be weighed and checked for balance at many intermediate stages of the manufacture, assuring that in the final blade there will be a proper weight distribution throughout and a more accurate balance. This feature is important in removing the hazard of destructive vibrations caused by improper balance or unequal weight distribution in the blades. Each blade is made to the same standards, making a greater certainty of equality between the blades for later assembly in propellers.

The parts and sections are constructed with a predetermined additional welding edge portion extending in a plane normal to the face of the edges. This enables accurate flash-welding operations in which the weld in each instance will be made after a predetermined flashing away of the metal and at a location where the blade contour of each part will be joined with that of the other.

The sequence of welding of the several seams is such as to facilitate cleaning and to avoid the handling of heavy parts as much as possible. For instance, the foils are first welded to the trailing edge forging so that there is ready access to the flash for cleaning, these welds being in the thinnest part of the blade. The welds of the leading edge forging are normally in a thicker part of the blade and can be cleaned from the ends of the section. Again, in making the transverse welds the tip is first welded to the adjacent tip or blade section and the shank is welded last. This avoids extra handling of the relatively heavy shank section.

The formation of the tip with a centering projection greatly facilitates mounting of the blade for balancing and for machining.

In the final blade the air foil surfaces comprise relatively flat thrust and camber plate-like members which are integral with each other along the leading and trailing edges and spaced from each other intermediate the edges to define an interior chamber providing a hollow blade. The thrust plate member of the blade consists of plate 11 and the component adjacent portions of edge members 8 and 9 and of tubular section 4 and tip 5, and the camber plate member of the blade consists of plate 10 and the component adjacent portions of the edge members 8 and 9 and of tubular section 4 and tip 5. Each of the ribs 31 and 33 extends transversely and continuously across the interior surface only of the foil plate members and constitutes a pair of separate reinforcing ribs for the thrust and camber members, which ribs are joined at their ends through the integral structure of the leading and trailing edges of the blade and are spaced from each other throughout the transverse extent of foil plate members. The ribs 31 and 33 are spaced from each other longitudinally of the blade, and the component ribs constituting each, face each other in spaced relation and extend uninterruptedly across the corresponding thrust and camber members to the leading and trailing edges of the blade.

The several features of the invention may be practiced and embodied in various ways within the scope of the accompanying claims. Certain of the features may be applied in the construction of blades fabricated by other than flash welding.

I claim:

1. A hollow steel propeller blade constructed of separately forged parts of varying thicknesses proportioned generally to the stress requirements of the corresponding portions of the blade, comprising a shank, a body and a tip, electric flash butt welds securing the same together along transverse lines, at least a part of the body consisting of separately forged leading and trailing edge members and foils, and electric flash butt welds securing said members and foils together along longitudinal lines, said flash butt welds being disposed between inwardly thickened edge portions of the several parts and joining the same to provide integral ribs internally of the blade along the seams and providing joints of smooth exterior contour avoiding breaks in the air foil surfaces of the blade.

2. A tubular section blank for a hollow steel aircraft propeller blade embodying a substantial twist in the airfoil surfaces thereof along the longitudinal axis of the blade and having its end edge portion at at least one end formed for electric flash butt welding to an adjacent section in the fabrication of the blade, said tubular blank having the twist of the blade and having the same shape and cross section that it has in the finished blade, and said edge portion being devoid of twist and extending longitudinally substantially parallel to the longitudinal axis of the section to provide for alignment with the corresponding edge portion of the adjacent section during welding and for flashing off of substantially the entire edge portion to the position of the blade shape in said section.

3. A body section blank for a hollow steel propeller blade comprising separately forged channel shaped leading and trailing edge members and foil members having the blade angle and pitch twist of corresponding portions of the blade, electric flash butt welds securing said members together along longitudinal lines intermediate the leading and trailing edges and the center of the foils, said body section blank having open ends with a portion at each end substantially devoid of pitch twist and adapted to be electrically flash butt welded to corresponding shank and tip sections to complete the blade.

4. A body section blank for a hollow steel propeller blade comprising separately forged leading and trailing edge members and foils disposed in spaced relation intermediate said edge members, and electric flash butt welds securing the longitudinal edges of the foils to corresponding edges of said members, the surface of the welds being smooth on the outside to provide a continuous unbroken air foil surface for the blade and being thicker than the adjacent stock toward the inside to provide integral strengthening beads for the body section of the propeller.

5. An edge blank for the body section of a hollow steel propeller blade having a longitudinal twist therein, comprising a forged member having a generally V-shaped cross section with a substantially heavy central edge portion and with its sides formed to provide free edge portions with substantially parallel edge faces for electric flash welding to foils, said free edge portions being of thicker metal than the adjacent stock, and said member having the pitch twist of the blade with said free edge portions extending devoid of pitch twist for a substantial distance from the edge and in a direction substantially normal to the corresponding edge faces thereof.

6. A foil plate blank for the body section of a hollow steel propeller blade, comprising a forged plate embodying a twist to correspond with the pitch twist of the blade and having edge portions thicker than the adjacent stock on one face of the plate corresponding to the inside of the final blade, each edge portion extending in a direction substantially normal to the face of the respective edge to correspond in direction with the feeding movement required to electrically flash butt weld the edge to another part of the blade.

7. A shank blank for a hollow steel propeller blade comprising a forged tubular section having one end of substantially larger circumference than the other end, the smaller end of said tubular section being cylindrical and the larger end of said shank being partially flattened to the shape of the corresponding root portion of the blade for joinder to the inner end of a blade body section, and the larger end edge of the shank being disposed in a single transverse plane, said tubular section flaring outwardly from the center to said larger end, and having an edge portion with elements extending substantially parallel to the axis of the shank to provide for flashing off of said edge portion during electric flash welding of the same to the inner end of the adjacent blade body section.

8. A shank blank for a hollow steel propeller blade comprising a forged tubular section of tapered thickness and diameter for a portion of its length, a larger circumference and partially flattened at the thinner end, and having its flattened end edge in a plane transverse to the axis of the shank and provided with an end edge portion extending parallel to the axis of the shank to match that of an adjacent blade section to be electrically flash butt welded thereto, said end edge portion having greater thickness toward the inside than the adjacent stock of said shank.

9. A tip blank for a hollow steel propeller blade comprising a forged member having a thin flat substantially semicircular body with a cavity in the center of its diametric face and having a centering projection extending from its curved edge in the plane of the body and substantially at right angles to the diametric face thereof, said face edge of the tip blank being disposed in a transverse plane for welding to the outer end of a hollow body section of the propeller.

10. In the manufacture of a hollow steel propeller blade for aircraft, the providing of a plurality of complementary blade sections having thick edge portions and with the outer faces of the sections free of thickening, the electrical flash butt welding of sections of the blade together along longitudinal and transverse seams, and utilizing the thick edge portions to provide after welding a plurality of integral longitudinal and transverse inside ribs extending along the welds and adding rigidity to the blade resisting vibration of its component parts.

11. In the manufacture of a hollow steel propeller blade for aircraft, the method of constructing the central blade section comprising forging separate leading and trailing edge members of generally V-shaped cross section and curved and twisted to correspond with the leading and trailing edges of the blade, forging thrust and camber plates with the shape and twist of the foils of the blade, said edge members and foil plates being devoid of the extreme shank and tip portions of the blade of a length substantially shorter than the blade and sufficiently short to present straight edge portions adapted for electric flash butt welding, and electrically flash butt welding said plates to said members along longitudinal lines.

12. In the manufacture of a hollow steel propeller blade for aircraft, the method of constructing the central blade section comprising forging separate leading and trailing edge members of generally V-shaped cross section and curved and twisted to correspond with the leading and trailing edges of the blade, the trailing edge member having its free edges substantially closer to each other than those of the leading edge member and presenting correspondingly greater difficulty in inside flash trimming, forging thrust and camber plates with the shape and twist of the foils of the blade, electrically flash butt welding said plates to the respective edges of said trailing edge member, and thereafter simultaneously electrically flash butt welding the opposite corresponding edges of said plates to the respective edges of said leading edge member.

13. In the manufacture of a hollow steel propeller blade for aircraft, the method of constructing the central blade section comprising forging separate leading and trailing edge members of generally V-shaped cross section and curved and twisted to correspond with the leading and trailing edges of the blade, forging thrust and camber plates with the shape and twist of the foils of the blade and having longitudinal edge portions matching the corresponding edges of the leading and trailing edge members and of greater thickness than the adjacent stock of said plates, said edge members and foil plates being devoid of the extreme shank and tip portions of the blade and of a length substantially shorter than the blade and sufficiently short to present straight edge portions adapted for electric flash butt welding, and electrically flash butt welding the longitudinal edges of said plates to the respective edges of said leading and trailing edges to provide welded seams of greater thickness than the adjacent stock of the foils.

14. The method of making a separate shank for a propeller blade, comprising machining a thick tubular blank of a length less than about a quarter of the length of the blade and of substantially the diameter of the cylindrical shank portion to provide a tapered wall thickness running thinner at one end, forging said thinner end to a larger diameter and to a substantially conical shape, and flattening said expanded end portion to blade shape matching the adjacent section of the blade and having the blade angle and pitch twist of the finished blade.

15. In the manufacture of a hollow steel propeller blade for aircraft, the method of constructing tips to be butt welded to the ends of blade sections, comprising providing a bar having ends of smaller diameter than the central portion, flattening the central portion while leaving the end portions substantially cylindrical, severing the pancaked central portion on a line transverse to the original axis of the blank to provide a pair of like tips, and thereafter finishing each tip preparatory to welding it to a blade section along a transverse seam containing the severed edge of said tip.

16. In the manufacture of a hollow steel propeller blade for aircraft, the method of constructing tips to be butt welded to the ends of blade sections, comprising providing a bar having ends of smaller diameter than the central portion, flattening the central portion while leaving the end portions substantially cylindrical, severing the pancaked central portion on a line transverse to the original axis of the blank to provide a pair of like tips, and utilizing the substantially cylindrical end portion as an axis for centering the blade for machining and balancing.

17. In the manufacture of a hollow steel propeller blade for aircraft, the method of constructing tips to be butt welded to the ends of blade sections, comprising providing a bar having ends of smaller diameter than the central portion, flattening the central portion while leaving the end portions substantially cylindrical, severing the pancaked central portion on a line transverse to the original axis of the blank to provide a pair of like tips, and providing a cavity in the form of a slot in the face of the severed edge of each tip to simulate the cavity in the end of a hollow blade section and thereby facilitate welding of the tip to the blade sections.

18. A hollow metal propeller blade for large aircraft operation employing a plurality of separate blades for each propeller assembly, comprising at least three tubular blade sections of forged steel construction with varying thicknesses proportioned to the stress requirements of the corresponding portions of the blade, and electric flash welds joining said sections end to end to complete the blade and providing transverse butt joints of smooth exterior contour indistinguishable from the exterior surfaces of the sections to provide an efficient air foil surface for the blade, the welds being thickened inwardly to constitute transverse strengthening ribs at the joints to provide a weld strength at least equal to the strength of the adjacent forged stock of the section.

19. A hollow metal propeller blade for large aircraft operation employing a plurality of separate blades for each propeller assembly, comprising at least three tubular blade sections of forged steel construction with varying thicknesses proportioned to the stress requirements of the corresponding portions of the blade, and electric flash welds joining said sections end to end to complete the blade and providing transverse butt joints of smooth exterior contour indistinguishable from the exterior surfaces of the sections to provide an efficient air foil surface for the blade, the welds being thickened inwardly to constitute transverse strengthening ribs at the joints to provide a weld strength at least equal to the strength of the adjacent forged stock of the sections, and the forged sections being thicker adjacent the welds to provide a wide rib and provide a gradual transition in thickness from the rib to the adjacent stock of the sections.

20. A hollow steel propeller blade fabricated from a plurality of separately forged parts, consisting of an airfoil section of substantially thin wall and a shank section of substantially thicker wall than the airfoil section, and in which the air foil part is fabricated separately from the thick walled shank and is joined thereto by an electric flash butt weld uniting the same along a transverse seam extending around the same.

21. A hollow metallic propeller blade comprising a pair of plates comprising flattened thrust and camber members disposed in facing relation and defining an interior chamber, and a reinforcing rib integral with one of said plates and extending into said chamber from the inner side only of said plate, said reinforcing rib being uninterrupted and disposed crosswise with respect to the longitudinal axis of said propeller blade and extending from a point adjacent the blade trailing edge to a point adjacent the blade leading edge, the surface of said reinforcing rib which faces the other plate being spaced from the interior surface thereof.

22. A hollow metallic propeller blade comprising a pair of plates comprising flattened thrust and camber members disposed in facing relation and defining an interior chamber, and spaced reinforcing ribs integral with one of said plates and extending into said chamber from the innerside only of said plate, said reinforcing ribs being uninterrupted and disposed substantially at right angles with respect to the longitudinal axis of said propeller blade and extending from a point adjacent the blade trailing edge to a point adjacent the blade leading edge, the surfaces of the respective reinforcing ribs which face the other plate being spaced from the interior surface thereof.

23. A hollow metallic propeller blade comprising a pair of plates comprising flattened thrust and camber members disposed in facing relation and defining an interior chamber, and a plurality of spaced reinforcing ribs extending into said chamber from each of said plates from the inner side only thereof, said reinforcing ribs being uninterrupted and disposed crosswise with respect to the longitudinal axis of said propeller blade and extending from a point adjacent the blade trailing edge to a point adjacent the blade leading edge, said ribs being arranged as sets, each set comprising a rib on the thrust member and a rib on the camber member, the two ribs of each set of ribs facing each other in spaced relation.

24. A group of separately forged metal blanks correlated in dimensions and adapted to be secured together by electric flash butt welding to constitute a hollow steel propeller blade, comprising a tubular shank blank, a tubular blade blank, and a tip blank, each of said blanks embodying a twist corresponding substantially to the twist of the final blade portion represented by the blank, and having end edge portions extending devoid of twist and substantially parallel to the longitudinal axis of the blank with the edge face in a plane substantially normal to the axis, whereby the several blanks may be electric flash butt welded together by burning off of said edge portions to provide transverse welds joining the body portions of the blanks with the twist of one blank merged with that of the adjacent blank across the weld.

25. A group of separately forged metal blanks correlated in dimensions and adapted to be secured together by electric flash butt welding to constitute a hollow steel propeller blade, comprising a tubular shank blank, a tubular blade blank, and a tip blank, each of said blanks embodying a twist corresponding substantially to the twist of the final blade portion represented by the blank, and having end edge portions extending devoid of twist and substantially parallel to the longitudinal axis of the blank with the edge face in a plane substantially normal to the axis, whereby the several blanks may be electric flash butt welded together by burning off of said edge portions to provide transverse welds joining the body portions of the blanks with the twist of one blank merged with that of the adjacent blank across the weld, and said straight edge portion of each blank being thicker than the body of the blank, toward the inside, whereby the transverse weld joints may be disposed in a bead of greater thickness than the adjacent blank sections in the finished blade.

26. The method of manufacturing a hollow steel propeller blade for aircraft having a predetermined outer airfoil surface and a series of straight internal ribs extending longitudinally of the blade to reinforce the same, comprising forging a plurality of blade sections substantially corresponding to the outer contour of the finished blade and having marginal edge portions corresponding to the inner ribs of the finished blade, providing excess laterally projecting metal along said marginal edge portions, forming the edge of the projecting metal to abut squarely the corresponding edge of the adjacent blade section, electrically flash butt welding said sections together, said welding including flashing away the excess metal from between the sections to properly position each section with respect to the adjacent section and to position the welds in the body of the ribs reinforcing said blade for maximum strength.

WILLIAM C. HEATH.

References Cited in the file of this patent

UNITED STATES PATENTS

| Number | Name | Date |
|---|---|---|
| 1,117,916 | Schmidt | Nov. 17, 1914 |
| 1,363,692 | Summers | Dec. 28, 1920 |
| 1,488,894 | Porter | Apr. 1, 1924 |
| 1,671,402 | Brown | May 29, 1928 |
| 1,718,061 | Miller | June 18, 1929 |
| 1,831,373 | Squires | Nov. 10, 1931 |
| 1,839,811 | Squires | Jan. 5, 1932 |
| 1,875,454 | Havill | Sept. 6, 1932 |
| 1,920,830 | Wylie | Aug. 1, 1933 |
| 1,952,569 | Smith | Mar. 27, 1934 |
| 1,989,796 | Firth | Feb. 5, 1935 |
| 1,996,850 | Bendix | Apr. 9, 1935 |
| 2,007,775 | Smith | July 9, 1935 |
| 2,008,234 | Weeks | July 16, 1935 |
| 2,011,121 | Sherman | Aug. 13, 1935 |
| 2,019,329 | Warren | Oct. 29, 1935 |
| 2,025,741 | Hansen | Dec. 31, 1935 |
| 2,170,865 | Lampton | Aug. 29, 1939 |

(Other references on following page)

UNITED STATES PATENTS

| Number | Name | Date |
|---|---|---|
| 2,214,338 | McKee | Sept. 10, 1940 |
| 2,231,772 | Nelson | Feb. 11, 1941 |
| 2,235,032 | McKee | Mar. 18, 1941 |
| 2,257,335 | Evans | Sept. 30, 1941 |
| 2,354,198 | Chubb | July 25, 1944 |
| 2,458,975 | Brady | Jan. 11, 1949 |

FOREIGN PATENTS

| Number | Country | Date |
|---|---|---|
| 220,673 | Great Britain | Aug. 28, 1924 |
| 452,611 | Great Britain | Apr. 9, 1936 |
| 541,759 | Great Britain | Dec. 10, 1941 |
| 700,360 | Germany | Dec. 18, 1940 |

OTHER REFERENCES

Metal Handbook, 1939 edition, published 1939 by American Society for Metals, Cleveland, Ohio. Pages 612, 613 and 614.

Welding Handbook 1942, published July 15, 1942, by American Welding Society, New York, N. Y. Pages 365–369, 371, 372, 375 and 376. Copy in Division 14.